JEAN BAPTISTE ADRIEN GUINDON
Inventor

J. B. A. GUINDON.
RIFLE.
APPLICATION FILED AUG. 6, 1910.

996,239.

Patented June 27, 1911.
10 SHEETS—SHEET 6.

JEAN BAPTISTE ADRIEN GUINDON
Inventor

Witnesses:

By

Attorneys

UNITED STATES PATENT OFFICE.

JEAN BAPTISTE ADRIEN GUINDON, OF MONTREAL, QUEBEC, CANADA, ASSIGNOR OF ONE-HALF TO ISAIE BELAIR, OF MONTREAL, CANADA.

RIFLE.

996,239.  Specification of Letters Patent.  Patented June 27, 1911.

Application filed August 6, 1910. Serial No. 576,002.

*To all whom it may concern:*

Be it known that I, JEAN BAPTISTE ADRIEN GUINDON, a subject of the King of England, and residing at Montreal, in the Province of Quebec, Canada, have invented certain new and useful Improvements in Rifles; and I do hereby declare that the following is a full, clear, and exact description of the invention, such as will enable others skilled in the art to which it appertains to make and use the same.

The invention to be hereinafter described relates to firearms, and more particularly to rapid fire magazine rifles.

The main objects of the invention are to provide a rapid fire rifle in which the loaded cartridges will be separately and automatically delivered to the loading mechanism; one in which the empty shells will be separately, automatically, and positively ejected; one in which the operating lever may be positively locked against movement in any direction; one in which the firing mechanism may be positively locked against operation; one in which reverse movement of the operating lever between either of its extreme positions, may be prevented; and especially, such a rifle, in which all of the parts are arranged to work with the greatest possible accuracy and precision, and one in which all of the parts are simply and economically constructed and compactly arranged in the minimum space.

A further object is to provide such a rifle of lighter weight and better service qualities than the present army rifle, and therefore, especially adaptable for army service.

In order to enable one skilled in the art to the more readily understand the construction, operation, and use of the invention, and the several parts thereof, reference should be had to the accompanying drawings forming part of the present application.

Throughout the figures of the drawings like reference characters designate the same parts in the various views.

Referring to the drawings in detail, 1 indicates a bifurcated barrel extension provided with a threaded bore 2 to receive the end of a rifle barrel provided with coöperating threads. This extension is adapted to support practically all of the operating parts and is provided with longitudinal inner grooves 3, lower rear notches 4, one lower centrally arranged notch 5, upper centrally arranged notches 6, vertical centrally arranged grooves 7, an inner recess 8, and a vertical groove 9, all for purposes to be hereinafter described. The barrel extension, of course, is suitably mounted in the gun stock in any usual and well known manner.

A hollow breech bolt 10 is provided with guide lugs adapted to travel freely in the longitudinal grooves 3 of the barrel extension 1. The breech bolt is provided with a centrally arranged longitudinal bore for the operation of a firing pin or plunger 11. One end of the firing pin extends through the rear of the breech bolt and is riveted or otherwise secured in a block 12 provided with lugs adapted to slide freely in the grooves 3 and guide the block as it is reciprocated, as will later appear. Within the body of the breech bolt is placed the plunger actuating coil spring 13 adapted to be engaged and compressed by a collar 14 as the breech bolt is forced forward, after the movement of the block 12 has been checked, as will later appear.

In order to retract the breech bolt to allow a cartridge to be dropped in line with the bore of the rifle barrel, link and lever mechanism has been provided. Depending from the rear end of the breech bolt 10 are two parallel ears or small plates 15. An L-shaped plate 16 has limited sliding movement between the ears 15, by means of a pin and slot connection 17 and 18. The short branch of the L shaped plate is provided with an elongated vertical slot or opening 19 and has a laterally extending guide bar 20 adapted to travel freely in the longitudinal grooves 3 of the barrel extension 1, to thereby support the L shaped plate 16 in its position and to guide it as it is moved. Movement of the L shaped plate 16, of course, causes a corresponding movement of the breech bolt. To effect movement of the plate, an operating handle lever 21 has been provided. This lever is provided with a stud or pin 22 projecting from its upper end and playing freely in the elongated slot 19, to have a sliding connection with the plate 16. The lever is provided with a rectangular hole intermediate of its ends adapted to receive a squared section 23 on the fulcrum pin or trigger bolt 24. The fulcrum pin is removably journaled in the ends of two parallel depending ears 25 of a yoke 26 which is removably secured in the rear notches 4 of the barrel extension and held therein by a pin passed through the rear ends of the two branches of the barrel extension and through the connecting portion of the yoke 26. The above described mechanisms operate to reciprocate the breech bolt 10 in the barrel extension 1.

In order to effect firing of the rifle, it is necessary, of course, to compress the coil spring 13 for operating the plunger or firing pin 11. This is done by checking or stopping the forward movement of the block 12, while continuing the same movement of the breech bolt 10. To accomplish this result, a sear 27 is provided. This sear is formed as a lug or short hook projecting inwardly from a spring steel arm 28 formed integrally with a bar 29 adapted to be rigidly secured in one of the rear notches 4 of the barrel extension 1. This arm is provided with an offset finger 30 adapted to be engaged by a hook 31 projecting laterally from one end of a trigger lever 32 which is revolubly mounted on the rounded section 33 of the fulcrum pin or trigger bolt 24. As the block 12 moves forward, its lower edge will be engaged by the sear 27 and it will be held against further movement. Consequently, as the lever 21 completes its rearward swing, the breech bolt 10 completes its forward movement and the compression of the spring 13 is complete. The plunger or firing pin 11, of course, is in retracted position. When the trigger lever 32 is pressed, the spring arm 28 will be slightly depressed, of course, thereby freeing the edge of the block 12 from the sear 27. The compressed spring 13 then drives the plunger 11 forward with great force, effecting firing of the cartridge.

The forward movement of the breech bolt, as usual, completes the loading of the rifle. The loaded shell is dropped in front of the breech bolt just before its forward movement begins, as will later appear. Consequently, it is necessary to prevent complete forward movement of the plunger until the breech bolt has reached its forward limit and forced the cartridge completely into the rifle barrel. Otherwise, the cartridge would be discharged partly in the magazine and great damage would result. For this purpose, a check block 34 has been provided. This check block is provided with an elongated vertically arranged opening 35 for the passage of the plunger 11, in order that the check block may have vertical movement relatively to the breech bolt. The check block is provided with a socket or recess 36 adapted to receive a stud 37 projecting from the end of a bolt or threaded pin which is screwed into the block 12. When the socket and stud are alined so that the stud will fit into the socket, the two blocks 12 and 34 may fit flush together. In such position, the tip or point of the plunger will project through the forward end of the breech bolt 10 into position to strike the percussion cap of the cartridge. However, when the stud 37 and socket 36 are not in line, the stud will not fit into the socket but will engage the adjacent face of block 34, thereby spacing the two blocks and holding the plunger 11 slightly retracted so that the point will not project from the breech bolt. The amount of this retraction, of course, may be regulated by screwing the stud 37 in one direction or the other, as desired.

Figure 16:
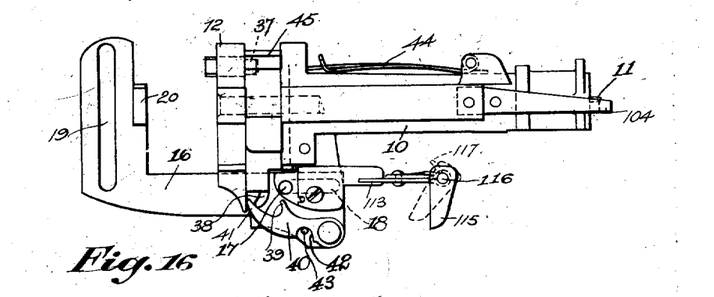
Fig. 16 is a side elevation of the breech bolt and its coöperating parts, removed.
Figure 17:
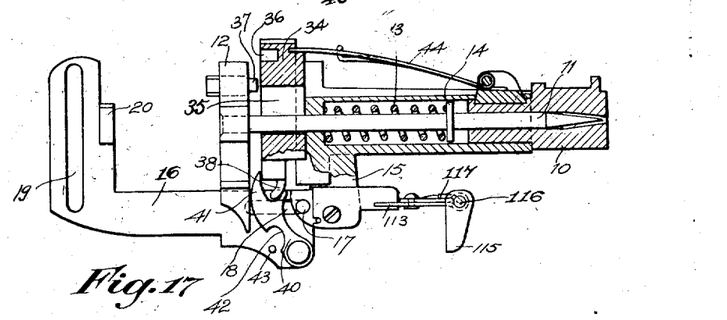
Fig. 17 is a view similar to Fig. 16, but showing the breech bolt in a central, vertical, longitudinal cross section.

The block 34 is raised immediately before the rearward movement of the breech bolt is begun and is kept in raised position until the return or forward movement of the breech bolt has been completed, thus keeping the socket 36 and stud 37 out of alinement during the entire operation of the breech bolt. As soon as the forward movement of the breech bolt has been completed and a cartridge has been forced completely into the barrel, the check block 34 is forced down to its original position and the rifle is ready for firing by a simple pressure on the trigger lever. The lower edge of the check block 34 is provided with a depending tongue 38 adapted to be engaged by a lip 39 on a dog 40 pivotally mounted on the forward end of the L shaped plate 16. This dog is formed with a rearwardly and slightly upwardly curved prong 41 and is provided with a notch 42 adapted to receive a stop or limit pin 43 projecting from the plate 16. The pin 43, of course, prevents dropping of the dog to inoperative position. On referring to Figs. 16 and 17, the operation of the dog 40 will be very clear. As it moves rearwardly with the plate 16, its prong will engage the face of the block 12. The block 12 forces the dog to turn upward so that its lip 39 will later engage the tongue 38 of the block 34. As the plate 16 continues its rearward movement, the dog 40 will continue to swing upwardly. In this way, the dog 40 will force the block 34 upwardly so that its socket 36 will be out of alinement with the stud 37 of block 12. The block 34 is guided in its upward movement by integrally formed side extensions or lugs which travel freely in the vertical grooves 7 of the barrel extension 1. These grooves lead into the longitudinal grooves 3. The several operating parts are so proportioned that, as soon as the lugs or side extensions of the block 34 reach the tops of the vertical grooves 7, the pin 17 will engage the forward end or wall of the slot 18 in the L shaped plate 16. Consequently, the breech bolt 10, block 12, and block 34, will all be drawn rearwardly with the L shaped plate 16. It should be stated here, however, that the tooth 41 acts, also, as a wedge between the adjacent portions of the blocks 12 and 34 and so forces the block 12 rearwardly before the lip 39 engages the tongue 38. This rearward movement of the block 12 is just sufficient to move the stud 37 completely out of the socket 36. In order to insure proper relative positions of the block 34 and the breech bolt 10, the block is slidably connected to the breech bolt by a dovetail mortise and tenon. A spring 44 is connected at its opposite ends, respectively, to the top of the block 34 and to the top of the breech bolt. This spring returns the block to its original position, as the breech bolt reaches the forward limit of its movement, thus permitting the stud 37 to enter the socket 36 so that the rifle may be fired when the sear 27 is moved from engagement with the block 12. In order to stop or limit the downward movement of the block 34 at the right point, it is provided with lateral flanges 45 overlapping the top edges of the barrel extension as the breech bolt is reciprocated. As the breech bolt reaches the extreme forward limit of its movement, these flanges drop into the notches 6 of the barrel extension, thereby alining the socket 36 with the stud 37.

Figure 34:
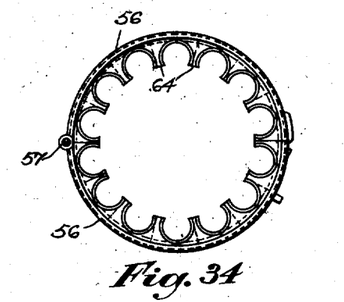
Fig. 34 is a rear end view of the magazine, closed, empty, and detached.
Figure 35:
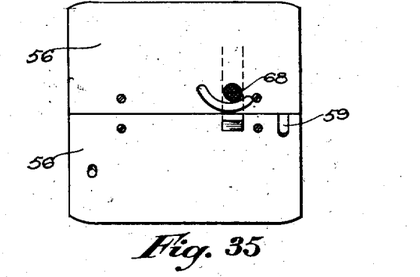
Fig. 35 is a right hand side elevation of Fig. 34.
Figure 36:
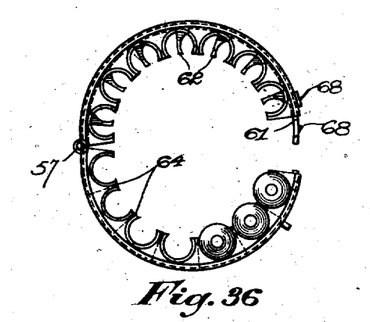
Fig. 36 is a view similar to Fig. 34, with the magazine open and one half partly loaded.
Figures 37, 38:
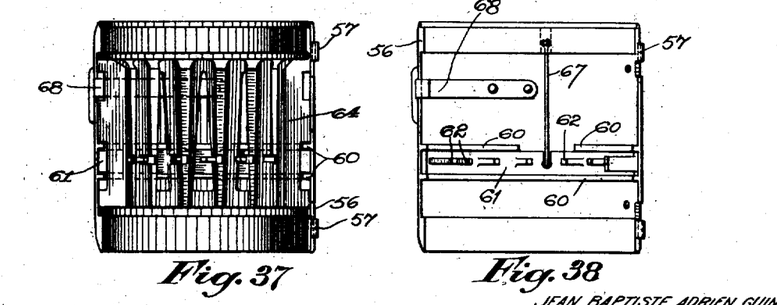
Fig. 37 is an inside plan view of one half of the magazine, in operative position.
Fig. 38 is an inside plan view of one half of the magazine shell or sleeve with spacing blocks removed.
Figure 39:
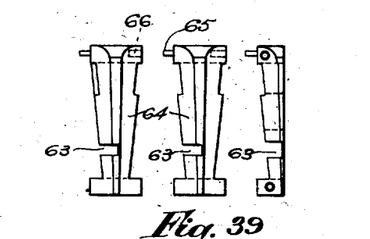
Fig. 39 is a top plan view of several of the cartridge spacing blocks, removed.
Figure 40:
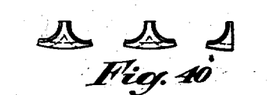
Fig. 40 is a bottom end elevation of Fig. 39.

The entire above described mechanisms are equally applicable to single shot firearms and to rapid fire firearms. Certain attachments and connections have been provided for use in combination with the above disclosed mechanisms, and particularly adapted for rapid fire. About the forward end of the barrel extension is secured, by means of screws or the like, a ring 47 on which is eccentrically formed a circular plate 48. The edge of this plate is provided with cups or seats for ball bearings 49 on which is revolubly supported a ring 50 U-shaped in cross section. A considerable distance in the rear of the ring 47 is secured a second circular plate 51, parallel with the first plate and in alinement therewith. This second plate is supported by brackets 52 bolted, respectively, to the plate and to the barrel extension. The edge of this plate is also provided with cups or seats for ball bearings and a ring 53, provided with a groove or ball race 54, is revolubly mounted thereon. This ring is provided with a rigidly connected band 55 which projects slightly above the adjacent surface of the plate. The two rings 50 and 53 are adapted to support a sleeve-like magazine or shell. This magazine comprises a split tube, sleeve, or shell 56 the parts of which are hinged together at 57. This shell is adapted to fit about the rings 50 and 53 like a bracelet. It is sufficiently long to extend slightly beyond both rings, when in position, as will appear on reference to Fig. 46 of the drawings. It is connected to the ring 50 by means of a stud 58 projecting from the ring and fitting into a notch 59 in one edge of one section of the shell or bracelet 56, when the magazine is in operative position. On the inner face of the shell 56 are formed two parallel spaced rims 60 which form a guide way for semicircular curved bars 61 each provided with a plurality of upwardly extending concave fingers 62 adapted to move into and out of notches 63 formed in the edges of concaved cartridge guides or supporting plates 64. These plates are each formed with coöperating notches 66 and pins 65 by which they may be coupled together, or interlocked, to form a continuous set of semicircles extending about the entire inner face of the sleeve 56—see Fig. 34. Each bar is provided with an actuating spring 67. One end of this spring is rigidly secured to the inside of the shell 56 while its opposite end plays freely in a notch formed in the edge of the bar 61. The notch is so arranged in the length of the bar that the spring 67 (when no cartridges are in the shell) will force one end of the bar slightly outward beyond the edge of the sleeve section—see the upper half of Fig. 36. In such position, the fingers will move from their notches outward between the plates 64. The two bars 61, of course, are so arranged that their projecting ends engage each other when the sleeve is being closed. In this way, each bar is forced inward against the tension of its spring. An ordinary hooked spring catch 68 may be used for holding the sleeve sections together. The concave fingers 62, of course, act to grip the cartridges against the supporting plates 64 and hold them in position while the sleeve is being loaded and placed about its supporting rings 50 and 53. As soon as the sleeve is clamped in place on the gun or rifle, the fingers will be forced into their notches 63 and become inoperative. Then the cartridges will be retained in their proper places until in position to be fed by gravity at the right time, all as will be hereinafter disclosed. The feeding is done by gravity. As a cartridge passes above the path of the breech bolt, it simply drops from the magazine downward and in front of the breech bolt. Consequently, in order to feed the cartridges, it is only necessary to rotate the shell 56 a single step as each shot is fired, thereby bringing a loaded cartridge into position to drop in front of the breech bolt at the instant that the breech bolt reaches its extreme rearward position. This is done by means of a pawl and ratchet mechanism operated by the lever 21 through suitable lever, link, and slide connections.

Figures 20, 21, 22, 23, 24, 25, 26, 27, 28, 29, 30, 31:
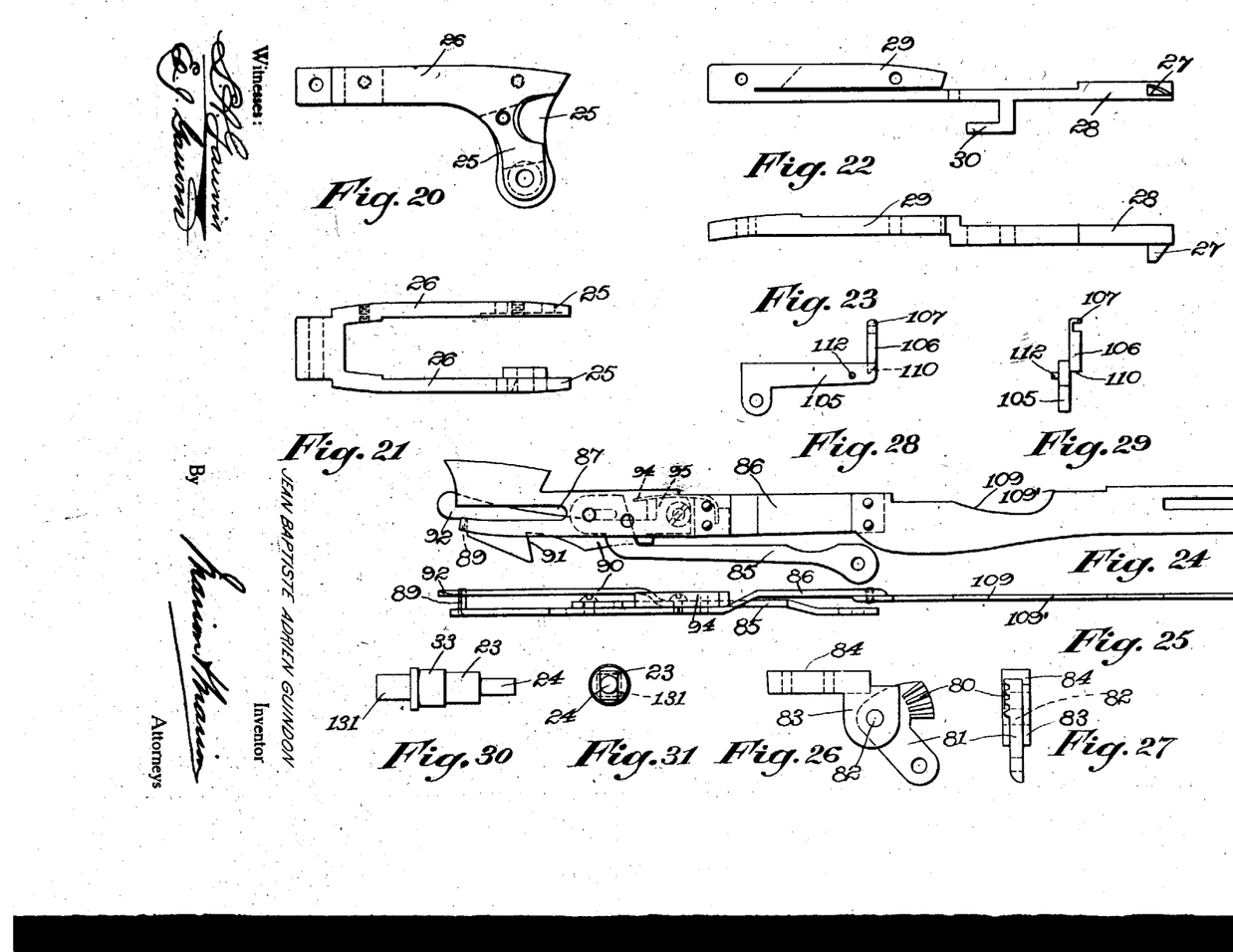
Fig. 20 is a right hand side elevation of the yoke for the actuating lever, detached.
Fig. 21 is a bottom plan view of Fig. 20.
Fig. 22 is a right hand side elevation of the sear, detached.
Fig. 23 is a bottom plan view of Fig. 22.
Fig. 24 is a right hand side elevation of the slide for actuating the ejector and magazine mechanism, detached.
Fig. 25 is a top plan view of Fig. 24.
Fig. 26 is a right hand side elevation of a segment gear forming part of the magazine actuating mechanism, detached.
Fig. 27 is a front view of Fig. 26.
Fig. 28 is a right hand side elevation of the ejector actuating hook, detached.
Fig. 29 is a rear end elevation of the same.
Fig. 30 is a side elevation of the trigger bolt, detached.
Fig. 31 is a right hand end elevation of Fig. 30.
Figures 41, 42, 43:
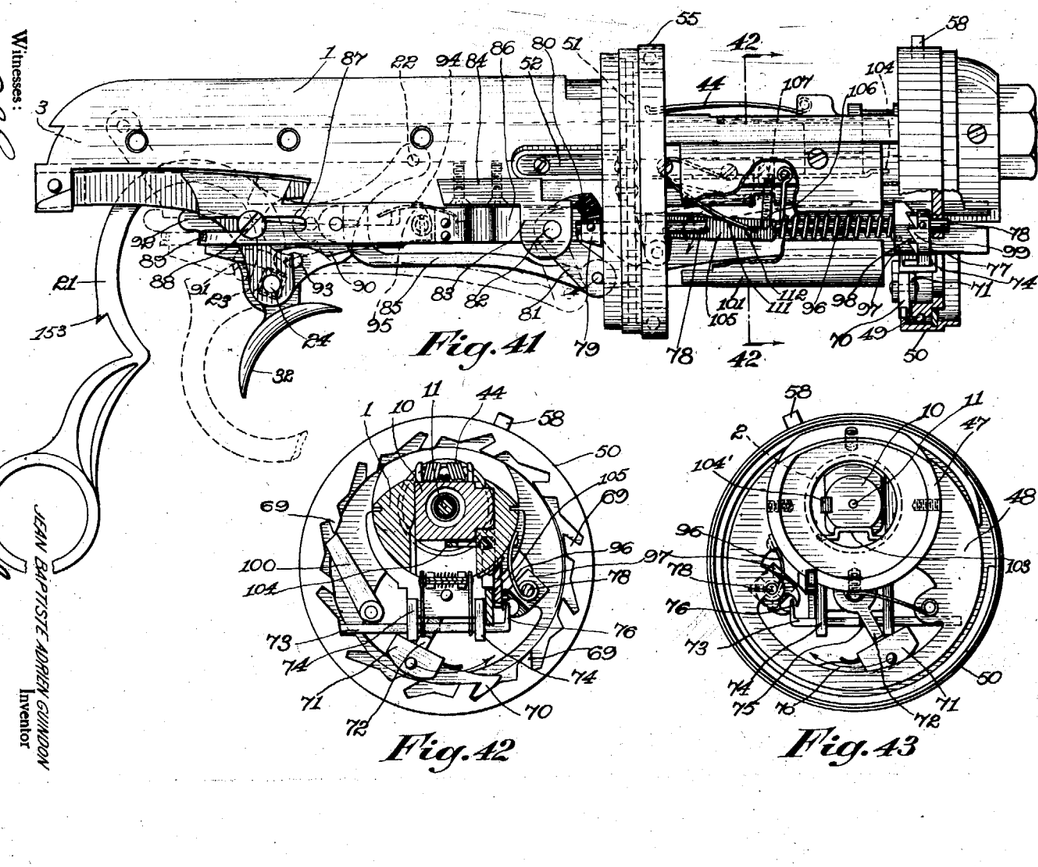
Fig. 41 is a right hand side elevation of the entire actuating mechanism, as applied.
Fig. 42 is a vertical cross section on line 42—42, looking in the direction of the arrows.
Fig. 43 is a front view of Fig. 41.

The inner edge of the U shaped ring 50 is formed as a ratchet with teeth 69 adapted to be successively engaged by a spring pressed pawl 70 pivotally mounted in a block 71 formed on or secured to the lower end of an arm 72 pivoted on a screw or the like in the plate or disk 48. Consequently, in order to effect step by step movement of the ratchet plate, it is necessary to swing the block 71 and its pawl 70 in the direction of the arrow in Fig. 42, until the tooth of the pawl engages the next tooth 69 of the ratchet, and then quickly swing the block and pawl in the opposite direction. In order to cause each forward swing of the pawl, a reciprocable slide bar 73 has been provided. This bar is slidably mounted in hangers 74 depending from the center of the plate or disk 48. A notch 75 is provided in the edge of the bar 73 to loosely receive the arm 72. Reciprocation of the bar 73, therefore, causes to and fro swinging of the arm 72. An upturned end or toe 76 is formed on the bar 73 and is adapted to be loosely engaged by a claw 77 rigidly secured to the end of a small rock shaft 78. The opposite end of the shaft 78 is provided with a small bevel gear segment 79 adapted to be engaged and operated by a small gear plate 80 formed on the end of one arm of a bell crank or elbow lever 81 fulcrumed at 82 in an ear 83 of a small block 84 adapted to be removably secured in the notch or recess 5 of the barrel extension. To the free end of the other arm of the bell crank 81 is pivoted one end of a link 85. The opposite end of the link is pivotally connected to a slide bar 86 provided with a longitudinal guide slot 87 adapted to receive a guide screw 88 or like device projecting from one of the ears 25. An upturned end or toe 89 is formed on the rear end of the slide bar 86, for a purpose to be later disclosed. To the slide bar 86 is also pivotally connected a second link 90 provided with a tooth 91 and a shoulder 92. The tooth 91 is adapted to be engaged by a stud 93 projecting from the operating lever 21 at a point a very short distance above its fulcrum. As the handle of the lever is swung forward, the stud 93, of course, will swing rearwardly. In its rearward movement, the stud 93 will engage the tooth 91 and draw the link 90 and slide bar 86 with it. Continued forward movement of the handle of lever 21, however, will swing the stud 93 downward out of engagement with the tooth. The toe 89 overlies the shoulder 92, as will appear on reference to Figs. 24 and 25, and, therefore, intercepts the shoulder and limits the upward movement of the tooth 91 and its link 90. However, engagement between the tooth and stud, for a limited length of time, is insured by a leaf spring 94 which bears upon a shoulder 95 of the link 90 and holds it, normally, downward. Operation of the above described mechanism effects a forward movement of the pawl 70 into position to engage one of the ratchet teeth. It is necessary, of course, to effect instantaneous rearward movement of the pawl to cause the step movement of the magazine, for delivering the next cartridge. For this purpose, a coil spring 96 is provided. One end of the spring is hooked over a small pin projecting from the barrel extension, while the opposite end is made fast to a nut 97. The nut 97 is revolubly mounted on the shaft 78 and is provided with a plurality of clutch teeth 98 which are adapted to engage coöperating clutch teeth 99 formed on the adjacent face of the claw 77 which is fixed to the shaft. Consequently, the tension of the spring may be regulated by disengaging the clutch teeth and rotating the nut in one direction or the other, relatively to the claw 77. The tendency of the spring 96, of course, is to rotate the shaft 78 in a direction opposite to that caused by the forward swing of the handle of lever 21. Consequently, as soon as the tooth 91 escapes from its engagement with stud 93, the spring 96 will instantaneously rotate the shaft 78 reversely and thus swing the arm 72 rearwardly, effecting a one-step rotation of the ring 50 and the attached magazine, thus bringing a loaded cartridge in position to drop into the barrel extension in advance of the breech bolt. The parts are so proportioned, of course, as to effect escape of the tooth 91 from the stud 93 just at the moment that the breech bolt 10 has reached the extreme limit of its rearward movement. Consequently, the instantaneous rearward swing of the arm 72 will effect delivery of a loaded cartridge from the magazine into the barrel extension and in advance of the breech bolt at the instant that the forward movement of the breech bolt is about to begin.

It is absolutely essential, of course, that only a single loaded cartridge shall be delivered into the barrel extension at one time. To insure this result, the slide bar 73 is extended so that its straight end will engage the flat rear edge of each successive ratchet tooth 69 the instant that each step by step movement is completed. It will remain in such engagement during the entire forward movement of the breech bolt and will not begin to slide from the tooth until the rearward movement of the breech bolt is started. This engagement between the slide bar 73 and each tooth 69 is shown clearly in Fig. 42. Prevention of reverse movement of the magazine is equally essential. For this purpose, a spring operated dog 100 has been provided and is so mounted as to engage beneath the end of each successive tooth 69 as the ring 50 is rotated step by step. From the mechanism just described, it is evident that only a positive and accurate step by step movement of the magazine in the right direction may be effected.

Figures 1, 2, 3:
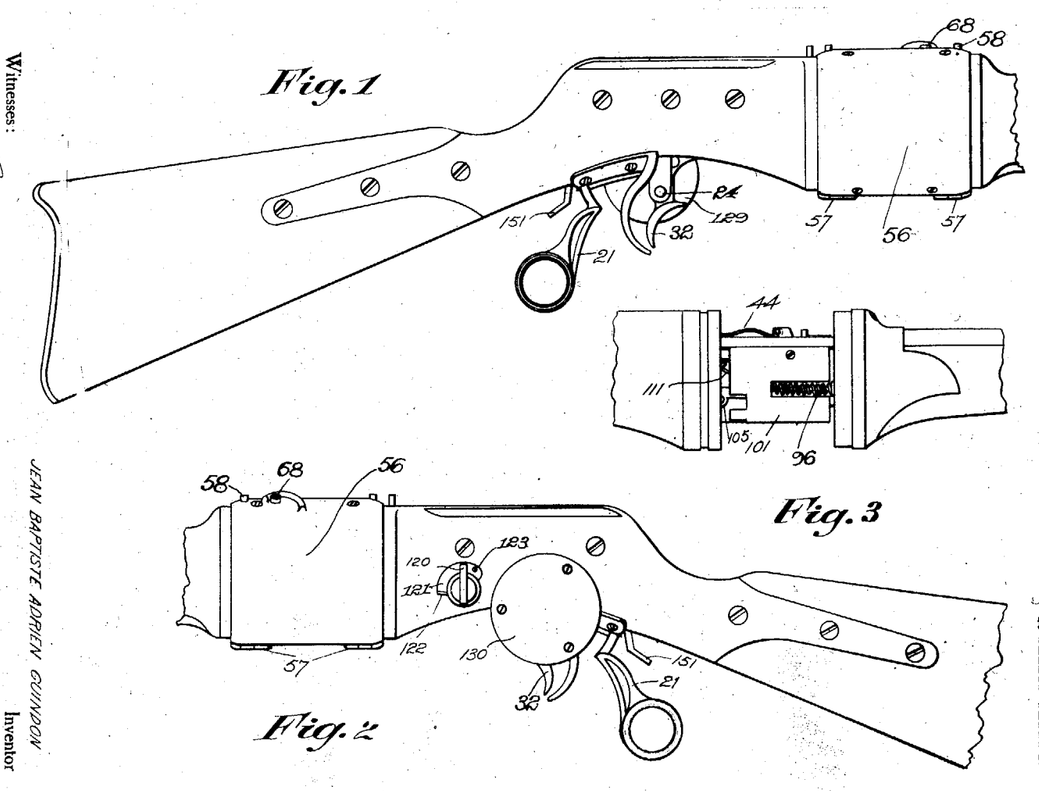
Figure 1 is a side elevation of the invention, as applied, reduced.
Fig. 2 is a like view of the opposite side.
Fig. 3 is a side elevation of the magazine portion of Fig. 1, with the magazine removed.

As previously stated, the holding fingers 62 in the magazine 56, become inoperative as soon as the magazine is clasped in position, thereby permitting the loaded cartridges to drop by gravity from their supporting blocks. While the magazine is in position it is necessary, of course, to retain in their supporting blocks all but the single loaded cartridge which is being dropped in advance of the breech bolt. To this end, a cylindrical shield 101 has been provided. This shield covers all of the working parts lying between the two rings 50 and 53 and, when the magazine is in position, leaves an annular space between it and the inner wall of the shell 56 of the magazine. This annular space is just of sufficient diameter to receive the loaded cartridges when the cartridges are in their proper positions. Consequently, this shield acts to retain the loaded cartridges, at all times, in their proper places. The shield is secured to the barrel extension by screws or any other suitable means and does not extend across the top of the barrel extension see Figs. 3 and 41. Consequently, at each step movement of the magazine, the cartridge which is brought above the barrel extension will drop by gravity from the magazine into the barrel extension, in advance of the breech bolt.

Figures 4, 5, 6, 7, 8:
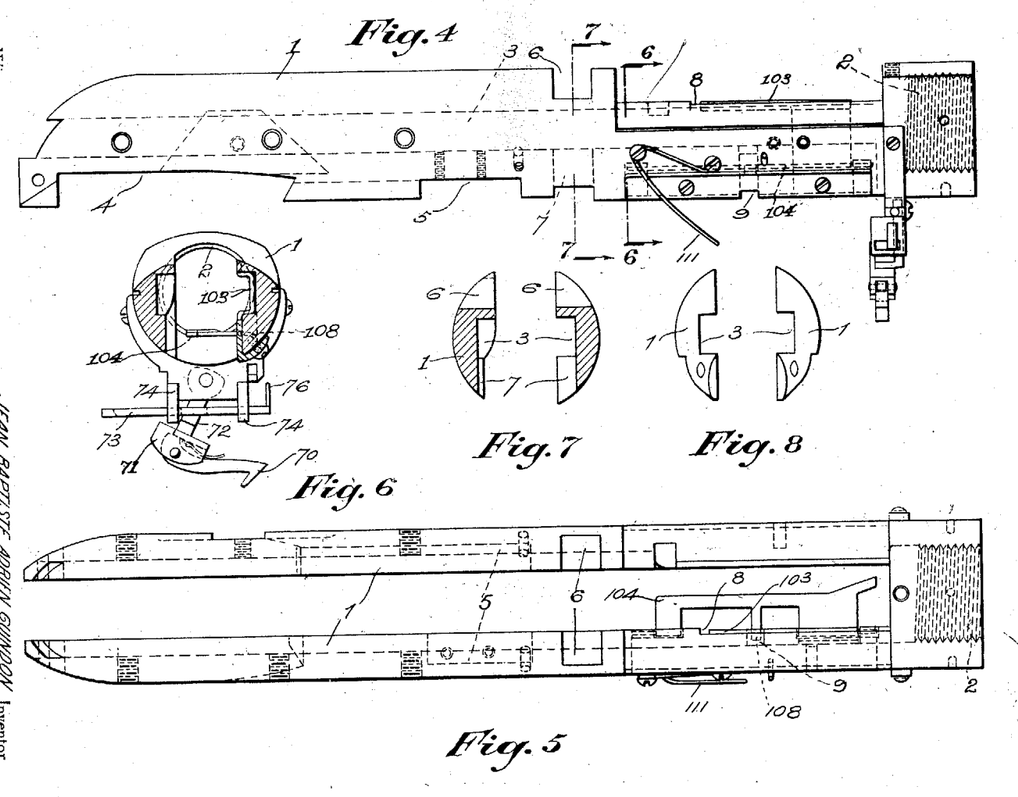
Fig. 4 is a right hand side elevation of the barrel extension for supporting the actuating mechanisms, with the magazine actuating means attached.
Fig. 5 is a top plan view of Fig. 4.
Fig. 6 is a section on line 6—6 of Fig. 4, looking in the direction of the arrow.
Fig. 7 is a section on line 7—7 of Fig. 4, looking in the direction of the arrow.
Fig. 8 is a rear end view of Fig. 4.
Figures 9, 10, 11:
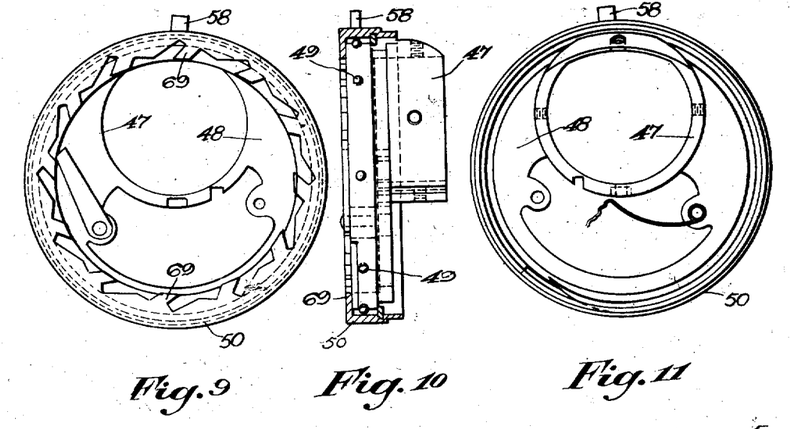
Fig. 9 is a rear elevation of the ring for actuating the magazine, as applied.
Fig. 10 is a central vertical cross section of Fig. 9.
Fig. 11 is a front elevation of Fig. 9.
Figures 12, 13, 14, 15, 32, 33:
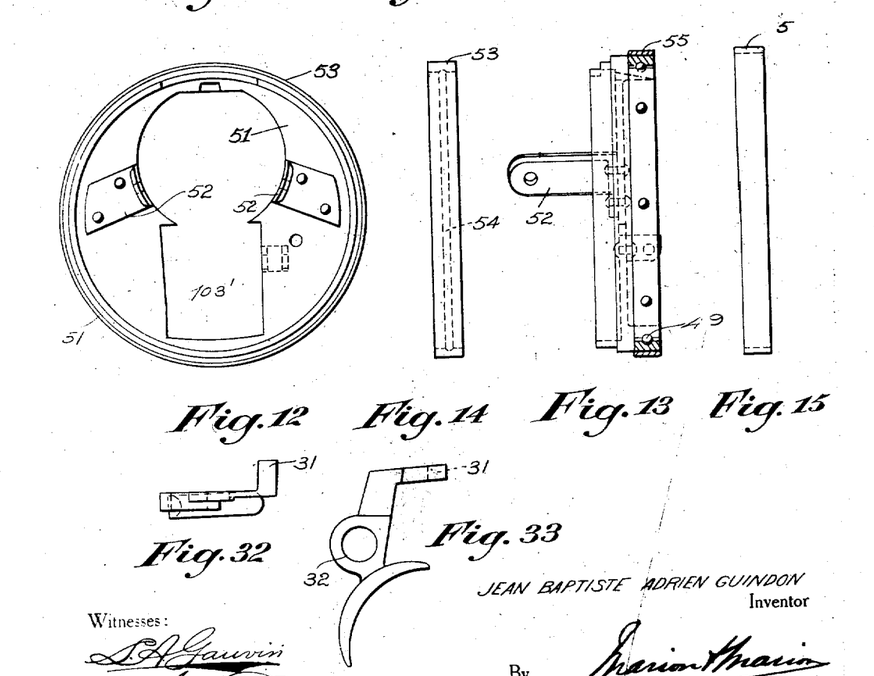
Fig. 12 is a rear elevation of the rear ring for the magazine and the supporting plate for the ring, as applied.
Fig. 13 is a central vertical cross section through Fig. 12.
Fig. 14 is a side elevation of the rear supporting ring, removed.
Fig. 15 is a similar view of a top band for the supporting ring.
Fig. 32 is a top plan view of the trigger, detached.
Fig. 33 is a right hand side elevation of the same.

The lower part of the shield is provided with two longitudinal upwardly extending walls 102 adapted to receive between them the empty shell of the discharged cartridge after it has been fired. These walls form a guide which is extended rearwardly through an opening 103¹ in the plate 51. The breech bolt 10 is provided with the usual extractor 104¹ which operates in the usual manner. As the breech bolt is moved rearwardly, the extractor 104¹ draws the empty shell from the barrel and the shell drops into the guide formed by the wall 102. To assist in the removal of the empty shell, a deflector is provided. This deflector comprises an angle plate having two arms 103 and 104 extending substantially at right angles to one another and is pivoted, at its angle, to the inner wall of one side of the barrel extension. The arm 104 is adapted to act as a support for the loaded cartridge as it drops from the magazine in front of the breech bolt. It supports the cartridge in line with the entrance to the barrel, of course. The arm 103, when not in use, lies snugly in the recess 8 of the barrel extension see Fig. 5. In order to swing the arms 103 and 104, positively, to and from their operative positions at the right times, a pivotally mounted arm 105, having an upwardly projecting offset finger 106, is provided. The upper end of the finger is formed as a hook 107 adapted to engage a small lug or like projection 108 at about the longitudinal center of the angle of the deflector. Consequently, upward movement of the hooked finger 106 will cause the deflector to turn on its angle, as an axis, so that the arm 104 will move into inoperative position and the arm 103 will move into operative position. As the hooked finger 106 makes its return movement, the deflector also makes a return movement. The first movement, or inward and downward swing of the arm 103, should be effected at the instant that the forward end of the breech bolt 10 passes rearwardly beyond the rear end of the arm 103. To accomplish this result, the slide bar 86 is provided with a cam surface 109 adapted to engage the lower beveled end 110 of the finger 106. The cam surface is so constructed that its high point $109^1$ will just reach the beveled end 110 as the tooth 91 escapes from the stud 93. The forward movement of the slide bar 86 at this instant brings the low part of the cam beneath the finger. A V shaped spring 111, secured at one end to the barrel extension and having its opposite end in engagement with a pin or stud 112 projecting from the arm 105, acts to move the arm 105 and finger 106 downwardly at the instant that the high point $109^1$ of the cam 109 passes forward from beneath the end of the finger. Thus, the arms 103 and 104 will be immediately returned to their original positions. The necessary vertical movement of the hook 107 and coöperating lug or projection 108, to effect movement of the arms 103 and 104, to and from complete operative positions, is so slight that it is effected almost instantaneously.

Figure 18:
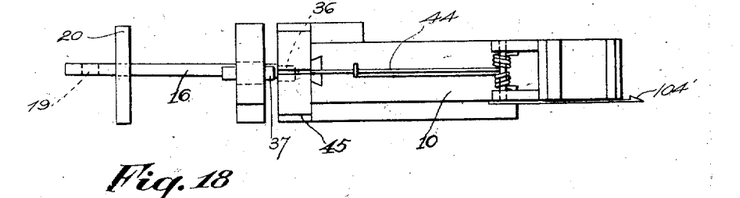
Fig. 18 is a top plan view of Fig. 16.
Figure 19:
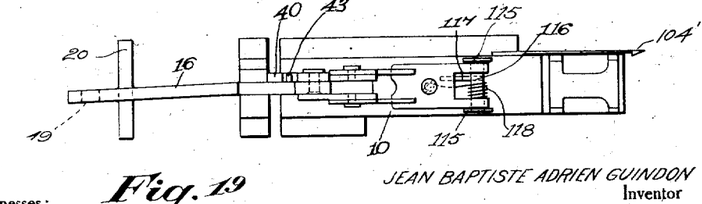
Fig. 19 is a bottom plan view of Fig. 16.

When the empty shell has been deflected and dropped into the guide formed by walls 102 it is still necessary to completely remove or eject it. For this purpose, a shell-grip or grapple has been provided. It comprises a plate 113 provided with ears adapted to be connected to the depending ears 15 of the breech bolt 10, and a pair of parallel spaced blades 115 yieldingly mounted in the forward end of the plate. These blades are rigidly secured to a small shaft or rod 116 journaled in the forward end of plate 113. A lug or stop pin 117 projects from the shaft and is adapted to engage the edge of the plate 113 to prevent forward swinging of the plates 115 beyond the vertical. A spring 118 yieldingly permits rearward swing of the blades but returns the blades to their vertical position immediately after the resistance has been passed, all as will appear on reference to Figs. 16, 18, and 19. The two blades are spaced apart a distance just equal to the greatest diameter of the body of an empty shell. Consequently, as the blades move forward with the breech bolt, they will engage the rim of the shell and be forced upward to the position indicated in dotted lines in Fig. 16. As soon as they pass over the rim, the spring 118 will move them to the position indicated in full lines. As the breech bolt is moved rearwardly, the blades will engage the rim of the shell and draw the shell through the guide between the walls 102 and out through a rear opening or slot in the casing of the stock, thus ejecting the shell.

From the preceding detailed description, it will be seen that as each empty shell is ejected another is simultaneously drawn from the barrel by the extractor $104^1$, and an instant later dropped to the guide below ready for the ejecting device.

Should it be desired to operate the magazine mechanism, and the loading, extracting, deflecting, and ejecting mechanisms, while at the same time preventing operation of the firing pin or plunger 11; a semi-cylindrical check bolt 119 is brought into play. This bolt is revolubly mounted in the casing of the stock. Normally, and when in inoperative position, the flat face of the bolt is parallel with and very close to the spring steel arm 28 carrying the sear 27. Rotation of the bolt in either direction will cause it to engage the arm 28 and hold the arm in raised position so that the sear 27 cannot be disengaged from the block 12, thus preventing operation of the plunger 11, while at the same time permitting operation of the other mechanisms. The bolt is provided with a thumb piece or handle 120 by which it may be operated. Its rotation is limited by a quadrant bar 121 provided with a lug or stop 122 at one end, and held in place by a screw or other device 123 passed through its opposite end and into the stock casing. The head of the screw engages the thumb piece 120 on one side and the lug 122 engages it in the opposite direction, thus limiting the rotation of the bolt to a quarter turn. The bolt is provided with a retaining pin 124 adapted to pass through notches 125 in an L shaped circular flange 126 extending about the opening through which the bolt passes. A coil spring 127, compressed between the botton of a cup shaped head 128 on the bolt and the top of the flange 126, acts to hold the bolt in its outward position and aids in its removal when the pins 124 are turned opposite the notches 125.

In order to prevent possible plugging or jamming of the mechanism, it is advisable, of course, to make each swing or movement of the operating lever 21 complete before the next one is started—that is, it is advisable not to reverse the movement of the lever 21 before the preceding movement has been completed. The mechanism to accomplish this result is all mounted on a small circular disk or plate 129 provided with a removable cup-like cover 130, and detachably secured, by screws or the like, in a circular seat on the casing of the rifle stock at a point adjacent the trigger bolt 24. In this disk is revolubly journaled a hollow hub 141 provided with a squared bore 133 adapted to fit the squared end 131 of the trigger bolt 24. Rigidly secured to the hub is a ratchet wheel 132 provided with two toothed sections 134 and 135. The teeth of these two sections project in opposite directions and are adapted to be alternately engaged by pawls 136 and 137. Pawls 136 and 137 are formed integrally with a block 138 which has limited movement in a recess 139 formed in the connecting member of a yoke 140 which is connected to the disk 129 by screws or the like. A rod 142 is fixed to the block 138 and loosely mounted in the side members of the yoke. Coiled about this rod and compressed between the block 138 and the side members of the yoke, are two compression springs 143. These springs act to hold the pawls, yieldingly, in engagement with the ratchet teeth.

A stud 144 projects upwardly from the head of the yoke and fits into a loop 145 formed on one end of a lever bar 146 fulcrumed in a cross piece 147 which is slightly spaced from the disk or plate 129. The opposite end of the lever bar is provided with an adjustable block adapted to be engaged by pins 148 carried by the ratchet wheel 132. These pins are so placed that one of them will engage one side of said adjustable block just as the handle portion of the lever 21 has completed its forward swing, and the other will engage the opposite side of the block just as the handle portion of the lever has completed its rearward swing. As soon as one of the pins engages the block 148', it will swing the lever bar 146 on its fulcrum and the movement of the lever bar will cause sliding of the yoke 140 which, in turn, will cause movement of the pawls 136 and 137. This movement of the pawls places the inoperative one in operation and the operative one out of operation. The shifting, of course, cannot take place until one of the pins engages the block 148'. Consequently, the lever 121, which must move with the trigger bolt only, must complete each forward or rearward swing before it can start on the next. In order to hold the yoke 140 against any possibility of slipping, the top edge of its connecting member is provided with two adjacent notches adapted to receive the point of a wedge shaped block 149 slidably mounted in a slot in the plate 129 and provided with an actuating spring 150. The spring is of sufficient strength to hold the block 149 seated in either of the notches except when the yoke 140 is forcibly moved by the lever bar 146. Then the strength of the spring is overcome and the block is forced upward until the other notch falls beneath it.

Figures 44, 45:
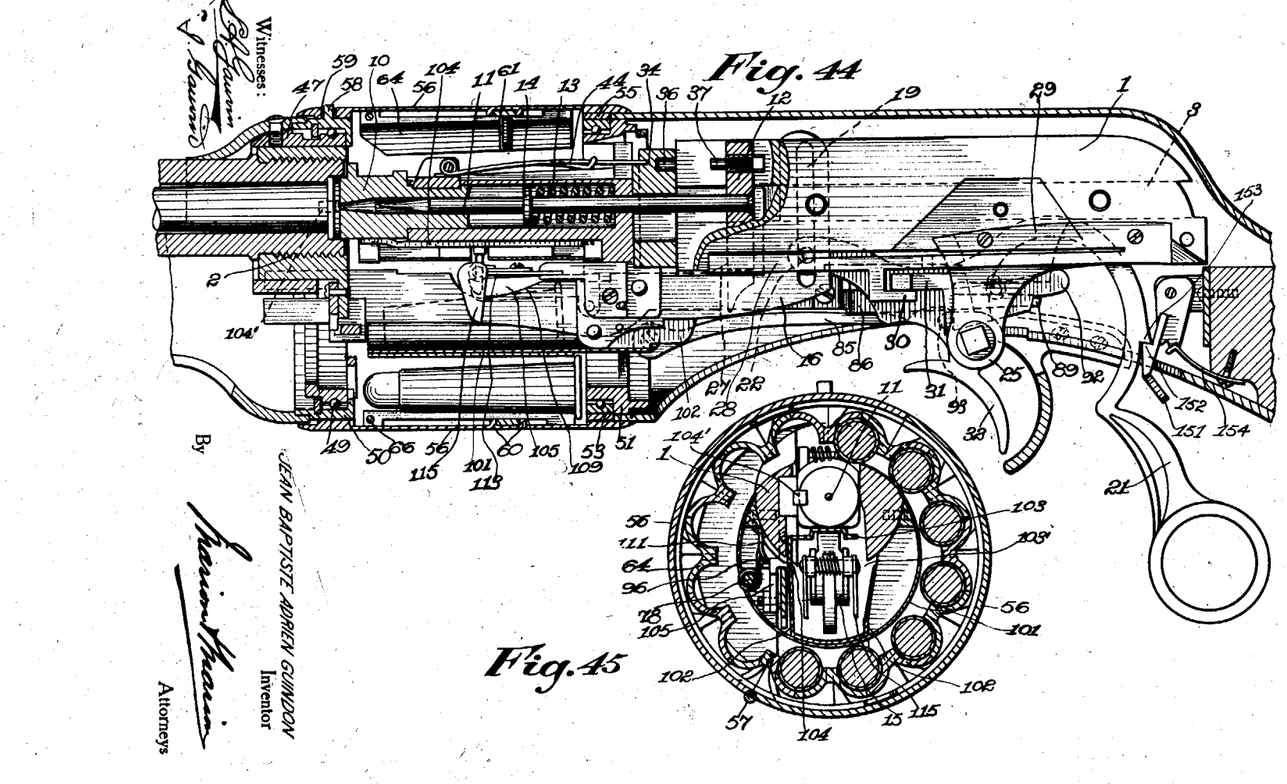
Fig. 44 is a central vertical longitudinal section of the actuating mechanism, as applied, with parts ready for firing.
Fig. 45 is a vertical cross section on line 45—45 of Fig. 46, looking in the direction of the arrows.

In order to entirely prevent operation of lever 21 and its connected parts, a safety latch 151 has been provided. This latch is mounted in the stock of the rifle directly in the rear of the lever 21 and is formed with a shoulder 152 adapted to engage a coöperating shoulder 153 formed on the rear of the lever 21. When the two shoulders are engaged, operation of lever 21 is absolutely impossible—see Fig. 44. The latch is held in operative, or inoperative position, as desired, by means of a leaf spring 154 which coöperates with notches formed in the shank of the latch.

Figures 46, 51, 52:
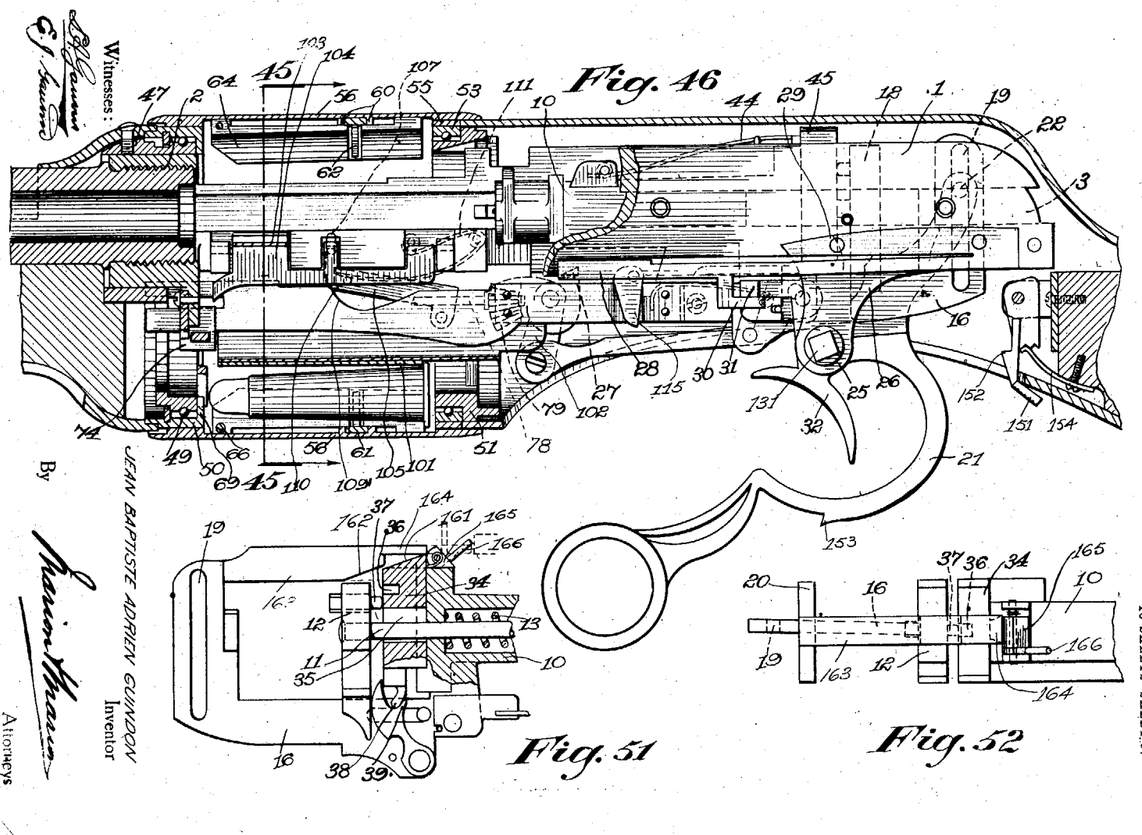
Fig. 46 is a view similar to Fig. 44, with breech bolt retracted.
Figs. 51 and 52 are views similar to Figs. 17 and 18, respectively, but showing a slight modification.
Figures 47, 50:
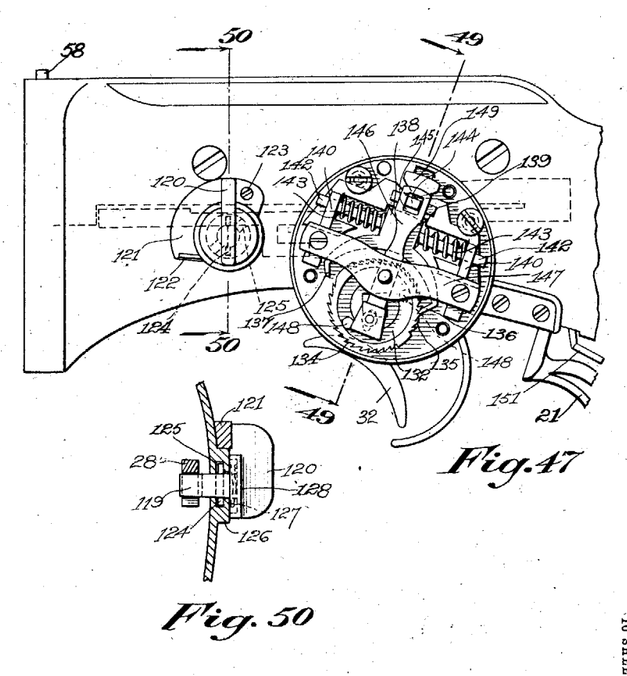
Fig. 47 is a top plan view of the mechanism for preventing intermediate reverse movement of the actuating lever.
Fig. 50 is a vertical cross section on line 50—50 of Fig. 47, looking in the direction of the arrows.
Figure 48:
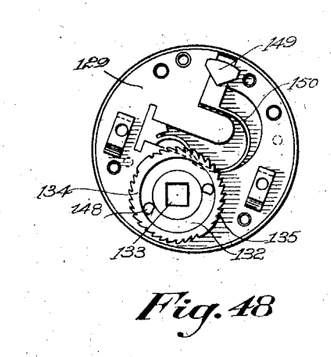
Fig. 48 is a view similar to Fig. 47, with all parts except the ratchet and pressure spring removed.
Figure 49:
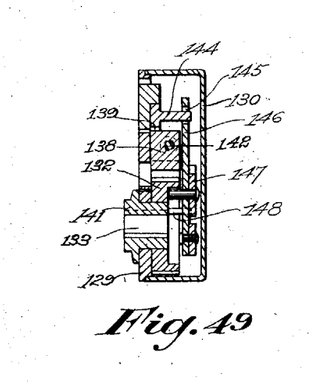
Fig. 49 is a vertical cross section on line 49—49 of Fig. 47, looking in the direction of the arrows.

In Figs. 51 and 52, a very slight modification of the mechanism for operating check block 34, is shown. In this construction the block is provided with a beveled rear surface 161 adapted to be engaged by a coöperating beveled edge 162 formed on the forward end of an arm 163 projecting forwardly from the L shaped plate 16. In order to prevent premature lowering of the block 34, the arm 163 is provided with a projecting finger 164 which engages the rear side of a spring operated cam block 165. This block is provided with an upwardly and forwardly inclined pin 166 which engages the rear edge of the disk 51, as the breech bolt completes its forward movement. As it engages the disk 51 it will be swung to the dotted line position of Fig. 51, thereby turning the cam block into position to permit continued forward movement of the arm 162 and consequent lowering of the check block 34. As soon as the rearward movement of the plate 16 has been started, the cam block 165 will be returned to its full line position by its spring.

It is thought that the operation and use of the several parts of the invention and their combinations will be clearly understood from the preceding detailed description.

Changes may be made in the construction, arrangement, and disposition of the several parts of the invention without in any way departing from the field and scope of the same and it is meant to include all such within this application wherein only preferred forms have been disclosed.

Having thus fully described my invention, what I claim as new and desire to secure by Letters Patent is:

1. In combination, a barrel extension, a breech bolt slidably mounted therein, an operating lever fulcrumed in said barrel extension and connected to said breech bolt, and means for preventing a reverse swing of said lever at any point intermediate of its extreme positions.

2. In combination, a barrel extension, a breech bolt slidably mounted therein, a spring actuated firing pin mounted in the breech bolt, a check block slidably connected to the breech bolt and adapted to prevent operation of the firing pin until the breech bolt has reached the limit of its forward movement, means for moving said check block to operative position, and means for moving said check block to inoperative position.

3. In combination, a barrel extension, a breech bolt slidably mounted therein, a spring actuated firing pin slidably mounted in said breech bolt, a block secured thereto, a check block slidably connected to said breech bolt and arranged between said bolt and said block, and means for successively giving a rearward movement to said block and an upward movement to said check block.

4. In combination, a barrel extension, a breech bolt slidably mounted therein, means for reciprocating said breech bolt, a spring actuated firing pin mounted in said breech bolt and provided with a block having a pin, a check block slidably connected to said breech bolt and provided with a socket adapted to receive said pin, and means for successively moving said block rearwardly, and raising said check block.

5. In combination, a barrel extension, a breech bolt slidably mounted therein, means for reciprocating said breech bolt, a spring actuated firing pin mounted in the breech bolt, a check block slidably connected to said bolt, means for automatically moving said check block to operative position, and means for maintaining said check block in operative position at all times during the reciprocation of the aforesaid breech bolt, except at the instant that the breech bolt reaches the end of its forward movement.

6. In combination, a barrel extension, a breech bolt slidably mounted therein, means for reciprocating said breech bolt, a spring actuated firing pin mounted in said breech bolt, a block secured thereto, a check block slidably mounted in said breech bolt and between it and said block, means for moving said check block to operative position, means for returning said check block to inoperative position, means for engaging the aforesaid block which is attached to the firing pin and holding it against forward movement during forward movement of the breech bolt, and means for releasing said holding means.

7. In combination, a barrel extension, a breech bolt slidably mounted therein, means for reciprocating said breech bolt, a spring actuated firing pin mounted in said breech bolt, a block secured thereto, a check block slidably mounted on said breech bolt and between it and said block, means for moving said check block to operative position, means for returning said check block to inoperative position, means for engaging the aforesaid block which is attached to the firing pin and holding it against forward movement during movement of the breech bolt, means for releasing said holding means, and means for securing said holding means in inoperative position.

8. In combination, a barrel extension, a breech bolt slidably mounted therein, a spring actuated firing pin slidably mounted in the breech bolt, a block connected to the rear end of the firing pin, a spring arm secured to the aforesaid barrel extension and provided with a sear adapted to engage the block and hold it against the action of the actuating spring of the firing pin, means for moving said arm to disengage its sear, a check block interposed between the rear end of the breech bolt and the block of the firing pin, means for moving said check block to operative position, and means for moving it to inoperative position at the instant that the limit of the forward movement of the breech bolt is completed.

9. In combination, a barrel extension, a breech bolt slidably mounted therein, a spring actuated firing pin slidably mounted in the breech bolt, a block connected to the rear end of the firing pin, a spring arm secured to the aforesaid barrel extension and provided with a sear adapted to engage the block and hold it against the action of the actuating spring of the firing pin, means for moving said arm to disengage its sear, a check block interposed between the rear end of the breech bolt and the block of the firing pin, means for moving said check block to operative position, means for retaining it in operative position during reciprocation of the breech bolt, and means for moving it to inoperative position at the instant that the limit of the forward movement of the breech bolt is completed.

10. In combination, a barrel extension, a breech bolt slidably mounted therein, a lever for reciprocating said breech bolt, an extractor mounted on said breech bolt, a deflector mounted in said barrel extension, means for actuating said deflector, a slide plate provided with a cam surface adapted to operate said actuating means, and connections between said slide plate and the aforesaid lever.

11. In combination, a barrel extension, a breech bolt slidably mounted therein, a lever fulcrumed in said barrel extension and connected to the breech bolt, a spring actuated firing pin mounted in said breech bolt, a block secured to the end of the firing pin, a spring arm seated in the barrel extension and provided with a sear adapted to engage the edge of the block connected to the firing pin, means for lowering the arm to disengage the sear, and a check bolt for holding the arm in raised position to maintain engagement between the sear and block.

12. In combination, a barrel extension, a breech bolt slidably mounted therein, a lever fulcrumed in the barrel extension and connected to said breech bolt, a spring actuated firing pin mounted in said breech bolt, a block secured to the end of the firing pin, a spring arm seated in the barrel extension and provided with a sear adapted to engage the edge of the block connected to the firing pin, means for lowering the arm to disengage the sear, means for holding the arm in raised position to maintain engagement between the sear and block, a gravity-feed magazine movably mounted on the aforesaid barrel extension and adapted to deliver cartridges thereinto, means for moving said magazine to effect such delivery, a slide bar, connections between the slide bar and the aforesaid lever, and connections between the slide bar and the means for actuating the magazine.

13. A magazine for rifles of the character described comprising sleeve sections hinged together and adapted to be clamped in position about the barrel extension, a plurality of cartridge supporting blocks mounted therein, and means for connecting said magazine in operative position about the barrel extension.

14. A magazine for rifles of the character described comprising sleeve sections hinged together and adapted to be clamped in position about the barrel extension, a plurality of cartridge supporting blocks mounted therein, means for connecting said magazine in operative position about the barrel extension, and means for clamping the cartridges to their blocks when the magazine is in open position.

15. A magazine for rifles of the character described comprising sleeve sections hinged together and adapted to be clamped in position about the barrel extension, a plurality of cartridge supporting blocks mounted therein, means for connecting said magazine in operative position about the barrel extension, and automatic means for clamping the cartridges to their blocks when the magazine is in open position.

In witness whereof I have hereunto set my hand in the presence of two witnesses.

JEAN BAPTISTE ADRIEN GUINDON.

Witnesses:
   T. MYNARD,
   L. A. GAUVIN.